(12) United States Patent
Sharma et al.

(10) Patent No.: US 11,108,755 B2
(45) Date of Patent: Aug. 31, 2021

(54) TELECOMMUNICATIONS APPARATUS AND METHODS

(71) Applicant: Convida Wireless, LLC, Wilmington, DE (US)

(72) Inventors: Vivek Sharma, Basingstoke (GB); Martin Warwick Beale, Basingstoke (GB); Shin Horng Wong, Basingstoke (GB); Brian Alexander Martin, Basingstoke (GB)

(73) Assignee: Convida Wireless, LLC, Wilmington, DE (US)

( * ) Notice: Subject to any disclaimer, the term of this patent is extended or adjusted under 35 U.S.C. 154(b) by 59 days.

(21) Appl. No.: 16/498,436

(22) PCT Filed: Mar. 27, 2018

(86) PCT No.: PCT/EP2018/057784
§ 371 (c)(1),
(2) Date: Sep. 27, 2019

(87) PCT Pub. No.: WO2018/178081
PCT Pub. Date: Oct. 4, 2018

(65) Prior Publication Data
US 2021/0092597 A1   Mar. 25, 2021

(30) Foreign Application Priority Data
Mar. 30, 2017   (EP) ..................... 17163988

(51) Int. Cl.
*H04M 1/66* (2006.01)
*H04M 1/68* (2006.01)
(Continued)

(52) U.S. Cl.
CPC ......... *H04L 63/062* (2013.01); *H04W 12/041* (2021.01); *H04W 12/0433* (2021.01);
(Continued)

(58) Field of Classification Search
CPC ........... H04W 12/041; H04W 36/0069; H04W 12/0433; H04W 12/08; H04W 12/06; H04W 88/08
(Continued)

(56) References Cited

U.S. PATENT DOCUMENTS

2013/0301611 A1\* 11/2013 Baghel .................. H04W 76/12
370/331
2016/0366175 A1\* 12/2016 Basu Mallick ....... H04W 76/19

OTHER PUBLICATIONS

3GPP TSG-RAN WG2#97, Athens Greece, Feb. 13-17, 2017, Huawei, HSillicon (Year: 2017).\*
(Continued)

*Primary Examiner* — Tanmay K Shah
(74) *Attorney, Agent, or Firm* — BakerHostetler

(57) ABSTRACT

A method of operating a second network access node comprises configuring the second network access node to act as a secondary network access node for a dual connectivity mode for a terminal device in which a first network access node acts as a master network access node. The method further comprises establishing, while acting as a secondary network access node for the dual connectivity mode, that the second network access node should switch to acting as a master network access node, deriving a new master network access node security key for use by the second network access node when switched to acting as a master network access node for the dual connectivity mode, and configuring the second network access node to act a master network access node for the dual connectivity mode using the new master network access node security key.

14 Claims, 9 Drawing Sheets

(51) Int. Cl.
  H04M 3/16      (2006.01)
  H04L 29/06     (2006.01)
  H04W 12/041    (2021.01)
  H04W 36/00     (2009.01)
  H04W 12/0433   (2021.01)
  H04W 12/06     (2021.01)
  H04W 12/08     (2021.01)
  H04W 88/08     (2009.01)

(52) U.S. Cl.
  CPC ........... *H04W 12/06* (2013.01); *H04W 12/08* (2013.01); *H04W 36/0069* (2018.08); *H04W 88/08* (2013.01)

(58) Field of Classification Search
  USPC ........................................................ 455/411
  See application file for complete search history.

(56) References Cited

OTHER PUBLICATIONS

International Search Report and Written Opinion dated May 14, 2018 for PCT/EP2018/057784 filed on Mar. 27, 2018, 12 pages.
3GPP, "3rd Generation Partnership Project; Technical Specification Group Radio Access Network; Study on New Radio Access Technology; Radio Interface Protocol Aspects", Release 14, 3GPP TR 38.804 V14.0.0, Mar. 2017, pp. 1-57.
3GPP, "Digital cellular telecommunications system (Phase 2+) (GSM); Universal Mobile Telecommunications System (UMTS); LTE; 3GPP System Architecture Evolution (SAE); Security architecture", Release 14, ETSI TS 133 401 V14.2.0, Apr. 2017, pp. 1-155.
3GPP, "LTE; Evolved Universal Terrestrial Radio Access (E-UTRA) and Evolved Universal Terrestrial Radio Access Network (E-UTRAN); Overall description; Stage 2", 3GPP TS 36.300 version 13.2.0 Release 13, Jan. 2016, pp. 1-298.
Ericsson, "Conditional Handover", 3GPP TSG-RAN WG2 #97 Tdoc R2-1700864 Update of R2-1700544, Athens, Greece, Jan. 13-17, 2017, pp. 1-5.
CATT, "NR Mobility Enhancement on Dual Connectivity", 3GPP TSG-RAN WG2 Meeting No. 97, R2-1700987 Revision of R2-1700222, Athens, Greece, Feb. 13-17, 2017, pp. 1-3.
Samsung, "Introduction of UE autonomous mobility", 3GPP TSG-RAN WG2 Meeting No. 97 R2-1701360 Resubmission of R2-1700400, Athens, Greece, Feb. 13-17, 2017, 3 pages.
Intel Corporation, "NW controlled autonomous handover in single connectivity", 3GPP TSG RAN WG2 Meeting #97 R2-1701711 Revision of R2-1700341 Athens, Greece Feb. 13-17, 2017, pp. 1-4.
Huawei, "0ms interruption handover for NR", 3GPP TSG-RAN WG2 #97, R2-1701799, Athens Greece, Feb. 13-17, 2017, pp. 1-6.
Ericsson, "SeNB to MeNB reconfiguration for NR dual-connectivity", 3GPP TSG-RAN WG2 #97 Tdoc R2-1702703 Spokane, USA, Feb. 3-7, 2017, pp. 1-3.
Huawei et al., "SgNB to MgNB reconfiguration for 0ms interruption handover", 3GPP TSG-RAN WG2 #97bis R2-1703381 Spokane, USA, Apr. 3-7, 2017, pp. 1-4.
NTT DOCOMO, "New SID Proposal: Study on New Radio Access Technology", 3GPP TSG RAN Meeting No. 71 RP-160671, Göteborg, Sweden, Mar. 7-10, 2016, 8 pages.
Harri Holma and Antti Toskala, "LTE for UMTS-OFDMA and SC-FDMA Based radio Access", John Wiley & Sons, Ltd., 8 pages.

* cited by examiner

TELECOMMUNICATIONS APPARATUS AND METHODS

CROSS-REFERENCE TO RELATED APPLICATIONS

The present application is based on PCT filing PCT/EP2018/057784, filed Mar. 27, 2018, which claims priority to EP 17163988.3, filed Mar. 30, 2017, the entire contents of each are incorporated herein by reference.

BACKGROUND

Field

The present disclosure relates to wireless telecommunications apparatus and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance. Other types of device, for example supporting high-definition video streaming, may be associated with transmissions of relatively large amounts of data with relatively low latency tolerance. Yet other types of device, for example used for autonomous vehicle communications, may be characterised by data that should be transmitted through a network with very low latency and very high reliability. A single device type might also be associated with different data traffic profiles/characteristics depending on the application(s) it is running. For example, different consideration may apply for efficiently supporting data exchange with a smartphone when it is running a video streaming application (high downlink data) as compared to when it is running an Internet browsing application (sporadic uplink and downlink data) or being used for voice communications by an emergency responder in an emergency scenario.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles and data transfer requirements, for example in terms of latency and/or reliability targets. See, for example, the 3GPP document RP-160671, "New SID Proposal: Study on New Radio Access Technology," NTT DOCOMO, RAN#71 [1].

The introduction of new radio access technology (RAT) systems/networks gives rise to new challenges for providing efficient operation for devices operating in new RAT networks, including devices able to operate in both new RAT networks (e.g. a 3GPP 5G network) and currently deployed RAT networks (e.g. a 3GPP 4G network).

One particular area where new approaches may be helpful is in relation to handovers between network nodes responsible for communicating with a terminal device, which may be referred to as mobility management. It will be appreciated handovers may result from a device physically moving between coverage areas of different cells or from changing radio conditions associated with different cells for a static device, and the term mobility management may be used for both scenarios.

In view of the above, there is a desire for new approaches for handling mobility in wireless telecommunications systems.

SUMMARY

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
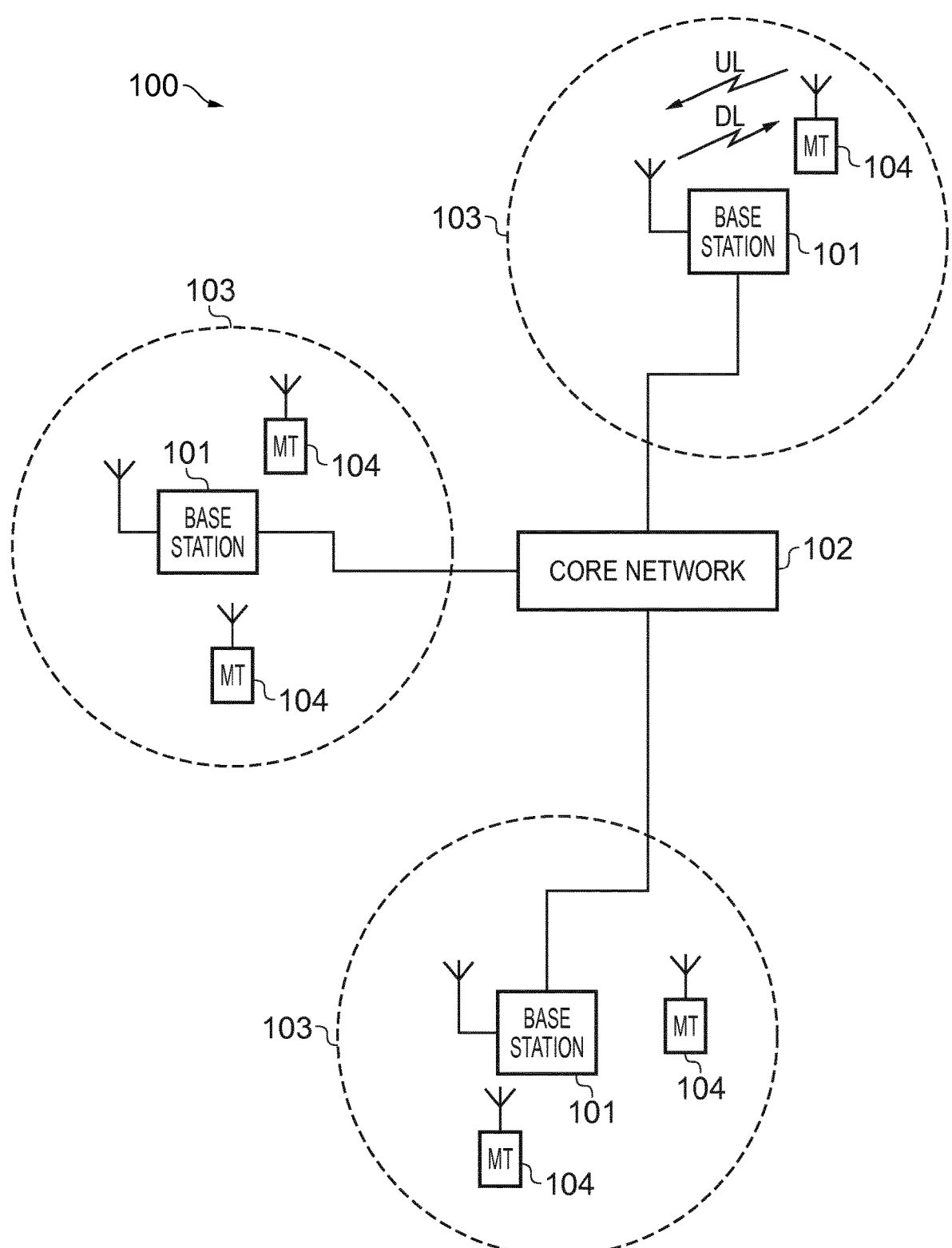
FIG. 1 schematically represents some aspects of a LTE-type wireless telecommunication network which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs, g-nodeBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity particular terminology may be used regardless of the underlying network architecture. That is to say, the use of a specific term in relation to certain example implementations is not intended to indicate these implementations are limited to a certain generation of network that may be most associated with that particular terminology.

Figure 2:
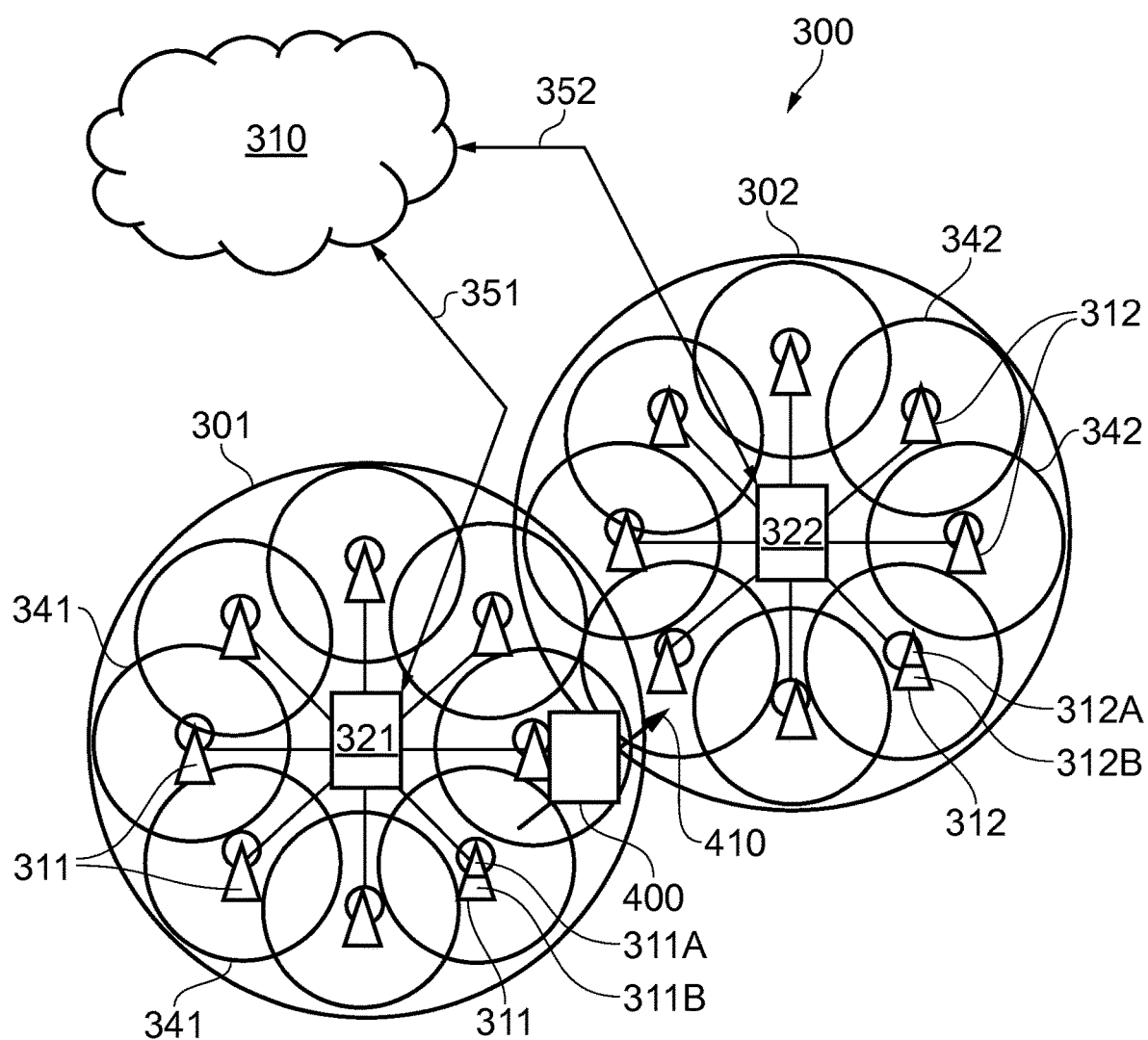
FIG. 2 schematically represents some aspects of a new radio access technology (RAT) wireless telecommunications network which may be configured to operate in accordance with certain embodiments of the present disclosure.

FIG. 2 is a schematic diagram illustrating a network architecture for a new RAT wireless mobile telecommunications network/system 300 based on previously proposed approaches which may also be adapted to provide functionality in accordance with embodiments of the disclosure described herein. The new RAT network 300 represented in FIG. 2 comprises a first communication cell 301 and a second communication cell 302. Each communication cell 301, 302, comprises a controlling node (centralised unit) 321, 322 in communication with a core network component 310 over a respective wired or wireless link 351, 352. The respective controlling nodes 321, 322 are also each in communication with a plurality of distributed units (radio access nodes/remote transmission and reception points (TRPs)) 311, 312 in their respective cells. Again, these communications may be over respective wired or wireless links.

The distributed units 311, 312 are responsible for providing the radio access interface for terminal devices connected to the network. Each distributed unit 311, 312 has a coverage area (radio access footprint) 341, 342 which together define the coverage of the respective communication cells 301, 302.

In terms of broad top-level functionality, the core network component 310 of the new RAT telecommunications system represented in FIG. 2 may be broadly considered to correspond with the core network 102 represented in FIG. 1, and the respective controlling nodes 321, 322 and their associated distributed units/TRPs 311, 312 may be broadly considered to provide functionality corresponding to base stations of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs.

A terminal device 400 is represented in FIG. 2 within the coverage area of the first communication cell 301. This terminal device 400 may thus exchange signalling with the first controlling node 321 in the first communication cell via one of the distributed units 311 associated with the first communication cell 301. In some cases communications for a given terminal device are routed through only one of the distributed units, but it will be appreciated in some other implementations communications associated with a given terminal device may be routed through more than one distributed unit, for example in a soft handover scenario and other scenarios. The particular distributed unit(s) through which a terminal device is currently connected through to the associated controlling node may be referred to as active distributed units for the terminal device. Thus the active subset of distributed units for a terminal device may comprise one or more than one distributed unit (TRP). The controlling node 321 is responsible for determining which of the distributed units 311 spanning the first communication cell 301 is responsible for radio communications with the terminal device 400 at any given time (i.e. which of the distributed units are currently active distributed units for the terminal device). Typically this will be based on measurements of radio channel conditions between the terminal device 400 and respective ones of the distributed units 311. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In the example of FIG. 2, two communication cells 301, 302 and one terminal device 400 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment may comprise a control unit/controlling node 321, 322 and/or a TRP 311, 312 of the kind shown in FIG. 2 which is adapted to provide functionality in accordance with the principles described herein.

As already noted, mobile communications networks such as the network 100 shown in FIG. 1 and the network 300 shown in FIG. 2 may be expected to support a wide range of services having different requirements, for example in terms of data rate, latency and/or reliability targets for the different services. One example use case currently considered to be of interest for next generation wireless communication systems includes so-called Ultra Reliable and Low Latency Communications (URLLC) [1].

URLLC services may be typically characterised as low latency services, for example aiming to transmit relatively small amounts of data through the radio network with a 1 ms packet transit time (i.e. so that each piece of URLLC data needs to be scheduled and transmitted across the physical layer in a time that is shorter than 1 ms) with high reliability, for example with a 99.999% reliability target. URLLC services may, for example, be applicable for safety-relevant communications, for example, communications relating to autonomous vehicle (driverless car) applications. Although certain embodiments of the disclosure may be described with reference to URLLC for convenience of terminology, it will be appreciated the principles and approaches described herein are not only applicable to URLLC services as currently proposed, but are generally applicable, in particular, but not exclusively, to services having the similar characteristics to URLLC services, for example in respect of a desire for low latency.

It has been proposed that uplink transmissions with relatively stringent latency requirements, such as for URLLC data, might in some situations be made using grant-free (non-allocated) radio resources. That is to say, a terminal device itself might autonomously select radio resources to use for transmitting an uplink data block, e.g. in terms of physical time and frequency resources, from among a predefined pool of available radio resources configured to support such grant-free transmissions. This is in contrast to the more common allocated/granted resources approach in which terminal devices receive resource allocation signalling (resource grants) from network infrastructure equipment/network access nodes to indicate the radio resources the terminal device should use for transmissions of uplink data to the network.

An advantage of grant-free resource approaches is lower latency as a terminal device does not need to wait to receive an allocation of uplink radio resources to use before it can start transmitting data which has become available for uplink. An advantage of granted resource approaches is the potential for improved overall efficiency in resource utilization as the entity responsible for allocating resources can allocate resources as and when needed and does not need to reserve a pool of resource to remain available for grant-free access that may not always be needed. Some implementations may support both grant-free and granted resource approaches for uplink transmissions for certain types of data, such as URLLC data. For example, a regular predictable URLLC transmission might be made using allocated resources while an irregular unpredictable URLLC transmission might be made using grant-free resources.

The inventors have recognised there are new issues to consider with using grant-free resources for uplink transmissions while a terminal device is in the vicinity of a boundary region between two communication cells, for example in situations of potential handover between radio network access nodes responsible for communicating with the terminal device in the two cells. In this regard it will be appreciated handovers may result from a device physically moving between coverage areas associated with different radio access nodes or from changing radio conditions associated with different cells for a static device, and the term mobility management may be used in relation to both scenarios.

In a handover procedure a terminal device is moved (handed over) from communicating with a first network access node (e.g. an LTE base station or 5G controlling unit) to communicating with a second network access node (e.g. another LTE base station or 5G controlling unit). The first network access node may be referred to as the source for the handover and the second network access node may be referred to as the target for the handover. A terminal device will typically be handed over from a source network access node to a target network access node because changing radio channel conditions mean the target network access node is better able to serve the terminal device than the source network access node, e.g. because the terminal device is moving. However, a handover may also be initiated for other reasons, for example for load balancing.

Many wireless telecommunications systems adopt a "break-before-make" approach to handovers. That is to say, the terminal device disconnects from the source network access node before connecting to the target network access node using a connection procedure. The inventors have recognised this can in some respects be detrimental for transmissions of some data, for example delay-sensitive data (e.g. URLLC data). This is because there is a time window between when the terminal device disconnects from the source network access node and when the terminal device has completed its connection procedure with the target network access node during which the terminal device is unable to transmit uplink data. This means if data for uplink should become available in this time window, it may not be possible to transmit the data within a target latency threshold. It has been proposed to adopt a "make-before-break" approach to handovers to support URLLC services and other services having relatively stringent latency requirements. Proposals include conditional handover approaches (see, for example, "Conditional Handover", 3GPP TSG RAN WG2 Meeting #97, R2-1700864, Athens, Greece 13—17 Feb. 2017 [3]) and autonomous (network driven) handover approaches (see, for example, "NW controlled autonomous handover in single connectivity", 3GPP TSG RAN WG2 Meeting #97, R2-1701711, Athens, Greece 13—17 Feb. 2017 [4] and "Introduction of UE autonomous mobility", 3GPP TSG RAN WG2 Meeting #97, R2-1701360, Athens, Greece 13—17 Feb. 2017 [5]). In proposed conditional handover approaches a terminal device might only hand over to a target cell if a signal quality of the serving (source) cell is below a predefined threshold and a signal quality of the target cell is above a predefined threshold. A conditional handover can help prevent a terminal from handing over too early or too late into the target cell, which could cause ping-ponging or radio link failure between the target and serving cells.

Thus, with a "make-before-break" approach, a terminal device does not lose the ability to transmit uplink data during a handover, but instead may transmit to two network access nodes during the handover procedure. Downlink data for the terminal device during the handover procedure may thus be routed from the core network to the terminal device via both network access nodes and the terminal device may thus receive the data via one or other, or both, network access nodes. If the terminal device successfully receives the data from both network access nodes, it may simply discard one copy of the data. Similarly, uplink data from the terminal device during the handover procedure may be transmitted to the core network via both network access nodes, which can help increase macro diversity. The core network may then discard one of the versions of the data or, with appropriate intercommunication between the two network access nodes, one network access node may instruct the other not to forward the data received from the terminal device to the core network if it is going to do so itself. In some cases, the uplink packets received by more than one network access node may be combined (e.g. via a selective combining procedure) with inter-communication between the network access nodes, or at a higher level of hierarchy than the network access nodes that support baseband and MAC processing. The combined packets may then be sent by one or other or both of the network access nodes to the core network.

Figure 3:
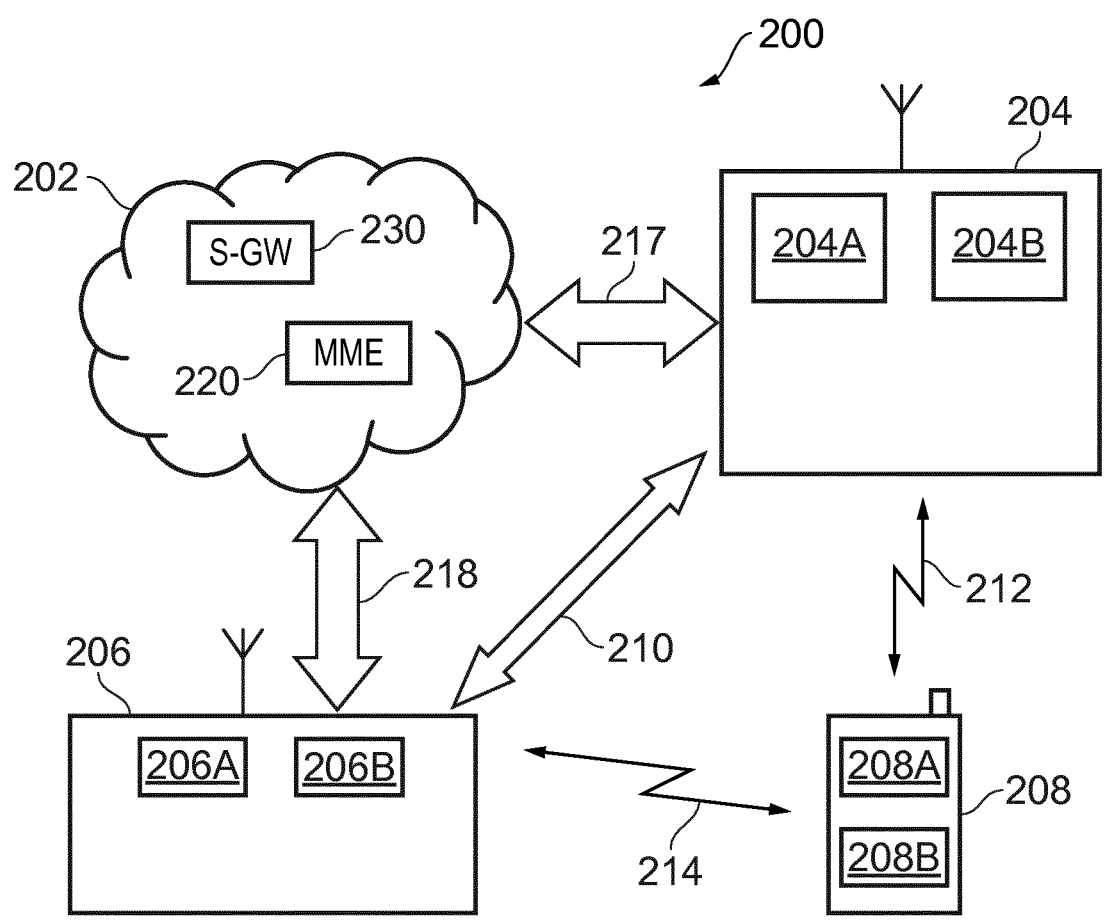
FIG. 3 schematically represents some aspects of a wireless telecommunication system in accordance with certain embodiments of the present disclosure.

FIG. 3 schematically represents some aspects of a wireless telecommunications system 200 configured to operate to support a terminal device 208 approaching a handover from a source network access node 204 to a target network access node 206 in accordance with certain embodiments of the disclosure. Aspects of the architecture and operation of the telecommunications system 200 which are not specifically described herein may be implemented in accordance with any previously proposed techniques, for example according to current 3GPP standards and other proposals for operating wireless telecommunications systems/networks. The network access nodes 204, 208 may, for convenience, sometimes be referred to herein as base stations 204, 208, it being understood this term is used for simplicity and is not intended to imply the network access nodes should conform to any specific network architecture, but on the contrary, these elements may correspond with any network infrastructure equipment/network access node that may be configured to provide functionality as described herein. In that sense it will appreciated the specific network architecture in which embodiments of the disclosure may be implemented is not of primary significance to the principles described herein.

The telecommunications system 200 comprises a core network part (evolved packet core) 202 coupled to a radio network part. The radio network part comprises the source network access node 204, the target network access node 206, and the terminal device 208. In this example, two network infrastructure elements 204, 206 and one terminal device 208 are shown for simplicity, but it will of course be appreciated that in practice the radio network part may comprise a larger number of base stations serving a larger number of terminal devices across various communication cells.

As with a conventional mobile radio network, the terminal device 208 is arranged to communicate data to and from the network access nodes (base stations/transceiver stations) 204, 206. Typically the terminal device will be connected to (i.e. able to exchange user plane data with) one network infrastructure element at a time. However, a terminal device may in some cases be simultaneously connected to both the first and second network nodes, in particular when it is operating in a region where there is the potential for a handover to occur, i.e. when the terminal device is in a boundary region between the geographic footprints associated with the radio coverage (cells) of the respective network nodes. The network access nodes 204, 206 are communicatively connected via respective communication links 217, 218 to the core network part 202, and in particular to a serving gateway, S-GW, 230 in the core network part 202 arranged to perform routing and management of mobile communications services to the terminal devices in the telecommunications system 200 via the network access nodes 204, 206. In order to maintain mobility management and connectivity, the core network part 202 also includes a mobility management entity, MME, 220 which manages the enhanced packet service, EPS, connections with the terminal device 208 operating in the communications system based on subscriber information stored in a home subscriber server, HSS. Other network components in the core network in this example implementation (not shown for simplicity) include a policy charging and resource function, PCRF, and a packet data network gateway, PDN-GW, which provides a connection from the core network part 202 to an external packet data network, for example the Internet. As noted above, the operation of the various elements of the communications system 200 shown in FIG. 3 may be broadly conventional apart from where modified to provide functionality in accordance with embodiments of the present disclosure as discussed herein.

The source network infrastructure element/access node 204 comprises transceiver circuitry 204a (which may also be referred to as a transceiver/transceiver unit) for transmission and reception of wireless signals and processor circuitry 204b (which may also be referred to as a processor/processor unit) configured to control the source network infrastructure element 204 to operate in accordance with embodiments of the present disclosure as described herein. The processor circuitry 204b may comprise various sub-units for providing functionality in accordance with embodiments of the present disclosure as explained further herein. These sub-units may be implemented as discrete hardware elements or as appropriately configured functions of the processor circuitry. Thus, the processor circuitry 204b may comprise circuitry which is suitably configured/programmed to provide the desired functionality described herein using conventional programming/configuration techniques for equipment in wireless telecommunications systems. The transceiver circuitry 204a and the processor circuitry 204b are schematically shown in FIG. 3 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the source network infrastructure element 204 will in general comprise various other elements associated with its operating functionality, such as a scheduler. For example, although not shown in FIG. 3 for simplicity, the processor circuitry 204b may comprise scheduling circuitry, that is to say the processor circuitry 204b may be configured/programmed to provide the scheduling function for the source network infrastructure element 204.

The target network infrastructure element/access node 206 comprises transceiver circuitry 206a (which may also be referred to as a transceiver/transceiver unit) for transmission and reception of wireless signals and processor circuitry 206b (which may also be referred to as a processor/processor unit) configured to control the target network infrastructure element 206 to operate in accordance with embodiments of the present disclosure as described herein. The processor circuitry 206b may comprise various sub-units for providing functionality in accordance with embodiments of the present disclosure as explained further herein. These sub-units may be implemented as discrete hardware elements or as appropriately configured functions of the processor circuitry. Thus, the processor circuitry 206b may comprise circuitry which is suitably configured/programmed to provide the desired functionality described herein using conventional programming/configuration techniques for equipment in wireless telecommunications systems. The transceiver circuitry 206a and the processor circuitry 206b are schematically shown in FIG. 3 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). For example, although not shown in FIG. 3 for simplicity, the processor circuitry 206b may comprise scheduling circuitry, that is to say the processor circuitry 206b may be configured/programmed to provide the scheduling function for the target network infrastructure element 206.

The terminal device 208 is adapted to support operations in accordance with embodiments of the present disclosure when communicating with the network access nodes 204, 206, and in particular when operating in a region when there is the potential for being handed off between them, as discussed further herein. The terminal device 208 comprises transceiver circuitry 208a (which may also be referred to as a transceiver/transceiver unit) for transmission and reception of wireless signals and processor circuitry 208b (which may also be referred to as a processor/processor unit) configured to control the terminal device 208. The processor circuitry 208b may comprise various sub-units/sub-circuits for providing functionality in accordance with embodiments of the present disclosure as described herein. These sub-units may be implemented as discrete hardware elements or as appropriately configured functions of the processor circuitry. Thus the processor circuitry 208b may comprise circuitry which is suitably configured/programmed to provide the desired functionality described herein using conventional programming/configuration techniques for equipment in wireless telecommunications systems. The transceiver circuitry 208a and the processor circuitry 208b are schematically shown in FIG. 3 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip (s)/chipset(s). It will be appreciated the terminal device 208 will in general comprise various other elements associated with its operating functionality, for example a power source, user interface, and so forth, but these are not shown in FIG. 3 in the interests of simplicity.

Thus for the example implementation scenario represented in FIG. 3 it is assumed the terminal device 208 is connected to the source network access node 204 over a radio path 212 and has moved to a location in which it may be handed over to the target network access nodes 206, e.g. due to mobility, so that it may communicate with the target network access node over the radio path 214. The specific procedure for determining if the terminal device should in fact be handed over may be based on conventional techniques, for example taking account of radio channel conditions associated with the respective radio paths 212, 214 and/or load balancing. A communications link 210 between the network access nodes 204, 206 is provided so they may exchange information, for example to support a handover procedure. In some network architectures the network nodes may communicate directly with one another, as schematically represented in FIG. 3, while in other network architectures they may communicate with one another indirectly via the core network part 202.

In accordance with certain embodiments of the disclosure, a terminal device that is operating in a region in radio coverage of multiple radio access nodes, for example where a handover from a first (source) network access node to a second (target) network access node might be expected to occur, may be configured to transmit at least a certain type of uplink data (e.g. delay intolerant data, such as URLLC data) using grant-free resources that are selected from a pool of available grant-free resources, wherein the pool of available grant-free resources are configured for use by both the first and second network access nodes (i.e. both network access nodes are monitoring and able to receive uplink transmissions made using the shared pool of grant-free resources). Thus, the terminal device may undertake single transmissions of a data block (packet) using resources selected from this reserved set of grant-free resources that is shared by both network access nodes, and this transmission may be received by either, or both, of the network access nodes.

Put another way, in accordance with certain embodiments of the disclosure a wireless telecommunications system may be configured to include a shared grant-free resource pool that is common to at least two network access nodes, and in particular for a handover scenario, a shared grant-free resource pool that is common to at least a source network access node/cell and a target network access node/cell. Uplink transmissions using resources selected by the terminal device from within the shared resource pool (shared set of transmission resources) may thus be received by both network access nodes.

A terminal device may be configured to use resources from within the shared grant-free resource pool in association with a handover procedure. For example, in an implementation that adopts a make-before-break approach to handover, the terminal device may be configured to use resources selected from within the shared grant-free resource pool during the time it is connected to both network access nodes (i.e. after it has connected to the target network access node, but before it has disconnected from the source network access node). In an implementation that adopts a break-before-make approach to handover, the terminal device may be configured to start using resources selected from within the shared grant-free resource pool when it is determined a handover may be imminent, for example based on changing radio channel conditions associated with a radio communications path between the terminal device and one or other, or both, of the source and target network access nodes. More generally, regardless of the approach to handover (i.e. whether make-before-break or break-before-make), the terminal device may be configured to use resources selected from within the shared pool of grant-free resources based on a determination as to whether the terminal device is in a boundary region between the communication cells supported by the source and target access nodes.

In accordance with the principles set out above, and elsewhere herein, as well as in other scenarios, a terminal device may in some cases transmit uplink data to a network node with which the terminal device does not have layer 2 synchronisation, for example in the sense of not having an agreed layer 2 cipher key with respect to the network node. Certain embodiments of the disclosure are concerned with higher layer processing of data received in a network by different network access nodes in such scenarios, and similar scenarios, in particular in relation to processing in layer 2 of the network protocol stack, for example in relation to a packet data convergence protocol (PDCP) entities/layers.

In the context of a terminal device operating in a wireless telecommunications system, different scenarios may be considered for terminal devices having different capabilities in respect of their ability to simultaneously communicate data in different cells/with different network access nodes during a handover procedure, i.e. when switching from communicating with a source network access node supporting communications in a source cell to communicating with a target network access node supporting communications in a target cell:

(Scenario 1) Terminal devices with a single transmitter/receiver (transceiver) can perform transmissions configured for one cell at a time in the case of inter frequency handover (i.e. for an inter frequency target network access node/cell). In this case it may be expected in the terminal device's protocol stack a packet processing entity, e.g. a PDCP entity, will generate packets offline and based on a network's user plane architecture, a RLC (radio link control) entity will prepare packets for transmission offline, and a MAC (medium access control) entity will transmit the packets based on a received uplink grant.

(Scenario 2) Terminal devices with dual transmitters/receivers (transceivers) may be initially configured with single connectivity and due to the terminal device mobility, may then be configured with dual connectivity if the target cell is operating on the same frequency or different frequency compared to the source cell (it has been proposed and agreed in 3GPP discussions that certain future wireless telecommunications system standards will support intra/inter frequency dual connectivity for URLLC and use packet duplication & dual connectivity during handover).

(Scenario 3) In other scenarios, terminal devices with a single transmitter/receiver (transceiver) may be involved in an intra frequency handover (i.e. for an intra frequency target network access node/cell). In this case a terminal device should be able to transmit on the shared resources and both cells should be able to receive uplink transmission on shared resources.

It may be noted there may be no issues in deciphering uplink packets received at the network via different wireless access nodes if PDCP is not relocated during handover (for example in the case of a control unit controlling a handover between source and target cell distributed units in a network architecture of the kind represented in FIG. 2) because transmissions associated with both the source and target cell may be ciphered/deciphered with the same key and key change does not happen. However, issues may arise with regard to ensuring the network has access to the appropriate keys for ciphering/deciphering in situations where PDCP is relocated during handover, or where different keys may be associated with different cells having a common PDCP entity (for example in the case that security/cipher keys are linked to cell identity, as has been proposed).

Certain embodiments of the present disclosure are primarily, although not exclusively concerned with Scenario 2. That is to say, certain embodiments are directed to approaches for supporting communications during a handover procedure for a terminal device that has the ability to communicate with two network access nodes at the same time, e.g. in accordance with proposed dual connectivity modes of operation.

Scenario 2: Terminal Devices with a Dual Transmitter/Receiver (Transceiver).

It has previously been proposed to use dual connectivity to support terminal devices during handover in wireless telecommunications systems.

The concept of dual connectivity (DC) was introduced in Release 12 of the 3GPP standard governing the LTE architectures and it is expected corresponding functionality will also be provided in new RAT (NR) networks. In dual connectivity, network access nodes are specified as being either master network access nodes or secondary network access nodes, and user equipment can connect to the network through both master and secondary network access nodes at the same time.

Figure 4:
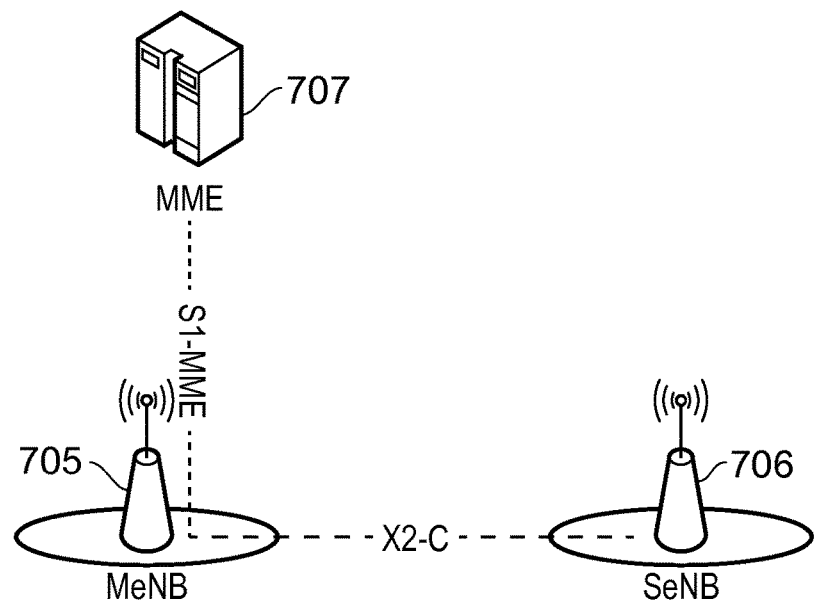
FIG. 4 shows a schematic representation of base stations and user equipment arranged for dual connectivity.

FIG. 4 shows a schematic representation of an example control plane architecture for dual connectivity. A master network access node 705 (designated MeNB) and a secondary network access node 706 (designated SeNB) communicate via a control plane using X2-C layer protocol. In dual connectivity only the MeNB 705 is designated for RRC handling. Consequently, the RRC entity resides in the MeNB 705, and communication with the core network in the form of a mobility management entity 707 (MME) via an S1-MME protocol layer terminates in the MeNB 705. It will be appreciated the use of terms such as "MeNB" and "SeNB", which are currently widely used in relation to current dual connectivity proposals, should not be interpreted as in any way restricting the approaches described herein to any specific generation of network architecture, but rather are use purely for convenience of terminology, it being understood that the terms are used to refer to elements of a wireless telecommunications systems having corresponding functionality, regardless of the underlying network architecture. For example, the terms MeNB and SeNB may be used in relation to NR networks, in which corresponding terms such as MgNB and SgNB might also sometimes be used.

Figure 5:
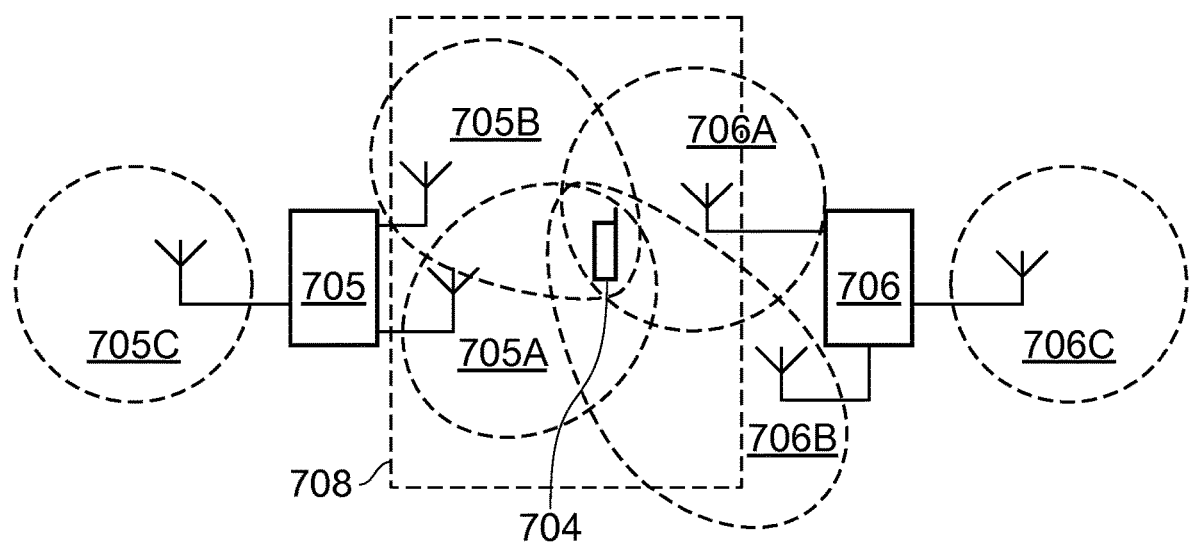
FIG. 5 shows a schematic representation of base stations and user equipment with cells arranged in groups.

It is possible for a network access node, being a master or a secondary eNB (network access node), to support more than one cell. FIG. 5 shows a schematic representation of part of a network having a MeNB 705 supporting three cells 705A, 705B and 705C, and a SeNB 706 supporting three cells 706A, 706B and 706C. A user equipment UE 704 has access to cells from both eNBs, indicated as the group 708. Within the group 708, one cell can be a primary cell, from the MeNB cells. Within the group 708 relating to the UE 704, the MeNB cells 705A and 705B are designated as a master cell group MCG, and the SeNB cells 706A and 706B are designated as a secondary cell group SCG. The UE 704 has access to the two cells of MCG and the two cells of the SCG, indicated by the overlapping cell areas in FIG. 5.

A purpose of the dual connectivity arrangement is to enable sharing and combining of resources belonging to different network access nodes. This sharing is expressed in the concept of split bearers.

Figure 6A:
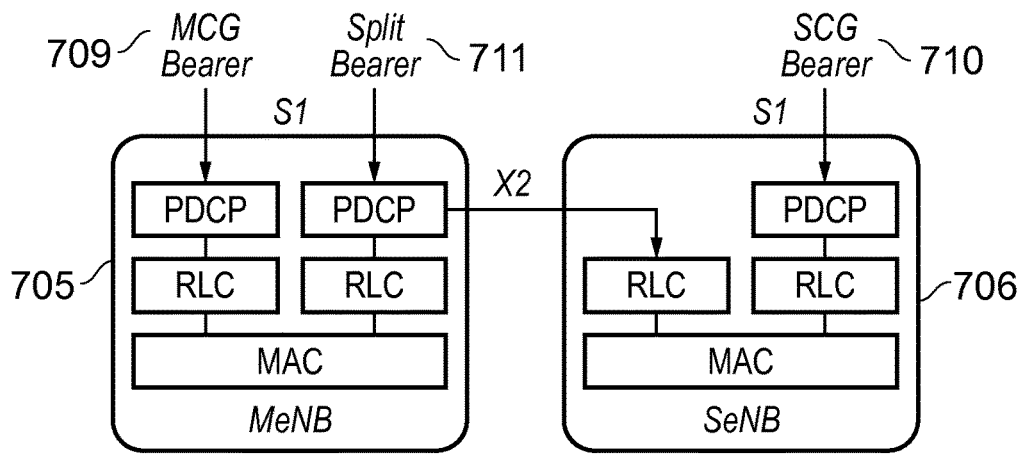
FIG. 6A shows a schematic representation of an example user plane protocol stack for dual connectivity.

FIG. 6A show a schematic representation of an example user plane protocol stack for a dual connectivity arrangement. Typically, an incoming message arrives via a bearer and is handled by the various protocol layers defined within the network architecture. Once master and secondary eNBs are defined and grouped in dual connectivity, one can further designate a bearer intended for the MeNB 705 as a master cell group bearer, MCG bearer 709, and a bearer intended for the SeNB 706 as a secondary cell group bearer, SCG bearer 710. A bearer arrives via the S1 protocol layer, is handled by the eNB's resources in turn by a packet data convergence protocol (PDCP), then a radio link control (RLC) protocol, and then the medium access control (MAC) layer. As shown in FIG. 6A, each eNB 705, 706 has these resource layers to handle received bearers.

In addition to the MCG bearer and the SCG bearer, dual connectivity defines a third, split bearer, for the purpose of sharing resources in the MeNB and the SeNB on the network side of the telecommunications system. A split bearer 711 is delivered to a PDCP in the MeNB 705, and the MeNB 705, at the PDCP, then controls a split or division of the split bearer's data between the MeNB 705 and the SeNB 706. Data for the MeNB 705 is passed to the MeNB's RLC and then its MAC, and data for the SeNB 706 is passed from the MeNB 705, using the X2 protocol layer, to an RLC in the SeNB and then to the MAC of the SeNB.

In order to be able to handle a message carried by a split bearer once it is passed on from the two eNBs, a UE is provided with two MAC entities, a master cell group MAC (MCG MAC) and a secondary cell group MAC (SCG MAC), plus corresponding RLC and PDCP. These are included in the resources of the UE for split bearer handling.

As mentioned above, only the MeNB has a RRC entity, so signalling radio bearers for RRC are transported over the MCG only, i.e. by MCG bearer. For UEs configured for dual connectivity and split bearer transport, user traffic from the core network can be received at the MeNB as a split bearer, and then divided between the MeNB and the SeNB for handling and passing to the UE. Any traffic on a SCG bearer is received from the core network at the SeNB and transported using resources of the SeNB to the UE.

Further details regarding dual connectivity can be found, for example, in ETSI TS 136 300 V13.2.0 (2016-01)/3GPP TS 36.300 version 13.2.0 Release 13 [6] (in particular Section 6.5).

As can be seen from FIG. 6, a bearer arrives at the PDCP protocol layer. The PDCP is involved in security of the data traffic, including ciphering using a key. Each PDCP in each network entity (eNBs and UEs, for example) will use its own key; these are regularly updated. The MeNB may use a key designated as KeNB, while the SeNB may use a key designated as SKeNB. Other parameters are utilised by the PDCP together with the key to effect security; these include a numerical counter to generate successive numbers in a sequence of count values. Hence there is a set of parameters, used in a security algorithm to perform the ciphering. Each set of parameters, one for each successive number from the count value, is used only once for ciphering, to maintain security. The count value has a maximum number that can be generated, so for a given key, once this number is reached, there are no new parameter sets available for ciphering. Re-use of parameters is undesirable, so it is preferred to acquire a new key for the PDCP and start the count value sequence again at its beginning (at zero, for example), to work through all successive values in the count value sequence with the new key. The expiration of the numbers available from the counter can be referred to as "rollover", and hereinafter the disclosure may mention "PDCP rollover", "PDCP counter rollover", "PDCP count rollover or "count rollover". The process following rollover, including acquisition of a new key, has a high processing overhead associated with it, and requires a resetting of the MAC layer for handling of ciphering with the new key.

An example of a possible network configuration for future telecommunications is an arrangement comprising an LTE architecture providing wide (macro) coverage in conjunction with a so-called new radio (NR), referring to current and future telecommunications methods allowing increased data throughput, such as 4th and 5th generations (4G and 5G) and further. The type of radio access technology (RAT) used in the LTE network and the new radio network may be different, but an LTE network and a NR network could interwork, where a benefit of having connectivity to both LTE and NR is reduced signalling towards the core network from mobility towards the core network being anchored at the LTE macro entity, combined with higher throughput made possible be utilising resources in both LTE and NR. A terminal device will be configured to operate under both RATs. In this context, dual connectivity may be relevant, such that MeNBs may be designated from LTE and SeNBs from NR, or vice versa.

Split bearers may also therefore be relevant for networks that support interworking between network access nodes based on different generations of radio access technology, for example a network that supports tight interworking between an LTE-based network access node and a NR-based network access node, and to facilitate this, a new split bearer configuration has been proposed, namely a secondary cell group split bearer, or SCG split bearer.

Figure 6B:
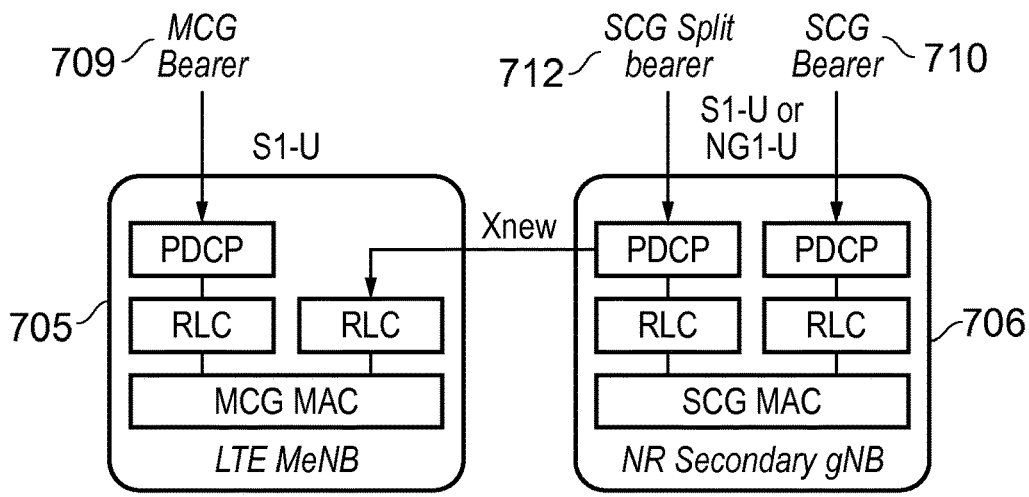
FIG. 6B shows a schematic representation of a modified example user plane protocol stack for dual connectivity.

FIG. 6B shows a schematic representation of an example user plane protocol stack utilising a SCG split bearer. As in FIG. 6A, a master node 705 (in this example in the LTE side) and a secondary node 706 each receive their designated bearers, MCG bearer 709 and SCG bearer 710 respectively, and these are handled by a PCDP, a RLC and a MAC layer, as before. No split bearer of the type shown in FIG. 6A is included, however. Instead there is a SCG split bearer 712 which is delivered to the SeNB 706 (labelled Secondary gNB in FIG. 5 to indicate a difference from the eNB of FIG. 4 owing to the addition of the NR network). A PDCP in the SeNB 706 receives the SCG split bearer 712 and divides the data. Some is retained in the SeNB, being passed to the RLC and MAC layers. Other data is passed from the SeNB 706 to the MeNB 705 via an X protocol layer (labelled Xnew to indicate possible change from the X layers within LTE, such as the X1 layer in FIG. 6A), and the MeNB 705 handles it with its own RLC and MAC resources.

As noted above, it has been proposed that dual connectivity may be used to support a terminal device during handover. Furthermore, it has been recognised this may involve a secondary network access node switching roles to become a master network access node, see, for example, "SgNB to MgNB reconfiguration for Oms interruption handover", 3GPP TSG-RAN W2 #97bis, R2-1703381, submitted for meeting at Spokane, USA, 3-7 Apr., 2017.

Figure 7:
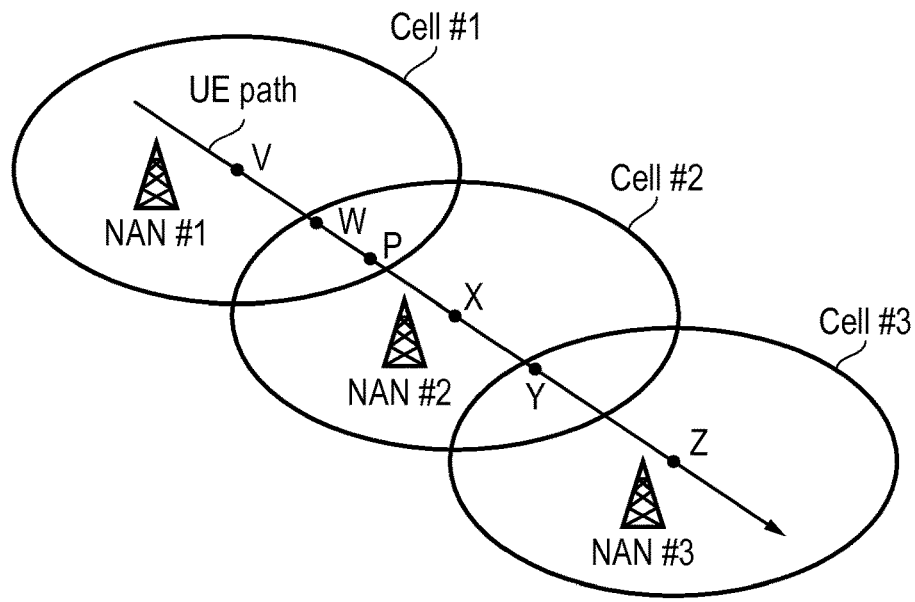
FIG. 7 schematically represents the path of a terminal device moving through the coverage areas for a number of cells.

FIG. 7 schematically sets out a scenario in which dual connectivity may be used to support terminal device handover. In this example it is assumed a terminal device follows a path (UE path) that passes through the coverage areas of three communication cells (cell #1, cell #2 and cell #3) respectively supported by three network access nodes (NAN #1, NAN #2, NAN #3), as schematically represented in FIG. 7. Dual connectivity may be used to support continuous communications with the terminal device as it moves along this path.

At point "V" along the path, the terminal device is in communication cell #1. At this location the terminal device may be configured for single connectivity on cell #1 (i.e. the terminal device is connected to NAN #1). At this point communications associated with the terminal device may be made via NAN #1.

At point "W" along the path, it is determined the terminal device is entering an overlap region between cell #1 and cell #2. This may be determined in accordance with conventional techniques associated with mobility in wireless telecommunications systems, for example taking account of relative radio channel conditions associated with NAN #1 and NAN #2. In response the terminal device is configured for dual connectivity with NAN #2 being configured for use as a secondary network access node (SeNB). At this point communications associated with the terminal device may be made via NAN #1 and/or NAN #2, in accordance with established proposals for dual connectivity.

At point "X" along the path, the terminal device has moved out of coverage of NAN #1. In one example implementation the terminal device may remain configured for dual connectivity with NAN #1 acting as master network access node (MeNB), despite being out of radio coverage, and NAN #2 acting as secondary network access node (MeNB). At this point communications with the terminal device may pass through NAN #2.

At point "Y" along the path, it is determined the terminal device is entering an overlap region between cell #2 and cell #3. This may be determined in accordance with conventional techniques associated with mobility in wireless telecommunications systems, for example taking account of relative radio channel conditions associated with NAN #2 and NAN #3. In response the terminal device's dual connectivity configuration is changed with NAN #3 being configured for use as a secondary network access node (SeNB), and NAN #2 consequently being reconfigured from being a secondary network access node to being a master network access node (MeMB). At this point communications associated with the terminal device may be made via NAN #2 and/or NAN #3, in accordance with established proposals for dual connectivity.

At point "Z" along the path, the terminal device has moved out of coverage of NAN #2. In one example implementation the terminal device may remain configured for dual connectivity with NAN #2 acting as master network access node (MeNB), despite being out of radio coverage, and NAN #3 acting as secondary network access node (MeNB). At this point communications with the terminal device may pass through NAN #3.

As noted above, in some examples the terminal device may retain its existing dual connectivity configuration as it moves out of an overlap region between two cells towards the centre of one of the cells (e.g. moving from point "W" to point "X", or moving from point "Y" point "Z"). However, this may result in a situation in which a terminal device is not within radio coverage of its master network access node, so that all communications are routed only through the secondary network access node. This may be considered undesirable in some cases. Thus in other implementations, a secondary network access node may switch roles to become a master network access node sooner. For example, in the above discussion regarding FIG. 7, NAN #2 switches from being a secondary network access node to being a master network access node for the terminal device when the terminal device is around point "Y" on its path. However, in another implementation, NAN #2 may instead switch from being a secondary network access node to being a master network access node (or indeed a sole network access node without using dual connectivity) for the terminal device when the terminal device is around point "P" on its path.

However, irrespective of the specific implementation in terms of when a secondary network access node should be reconfigured as a master network access node, it will be appreciated that approaches for supporting handover through dual connectivity should support such reconfiguring of the secondary network access node to a master network access node in a dual connectivity configuration. Certain embodiments of the disclosure are concerned with facilitating this process, and in particular in relation to handling of security/cipher keys in relation to this process.

Figure 8:
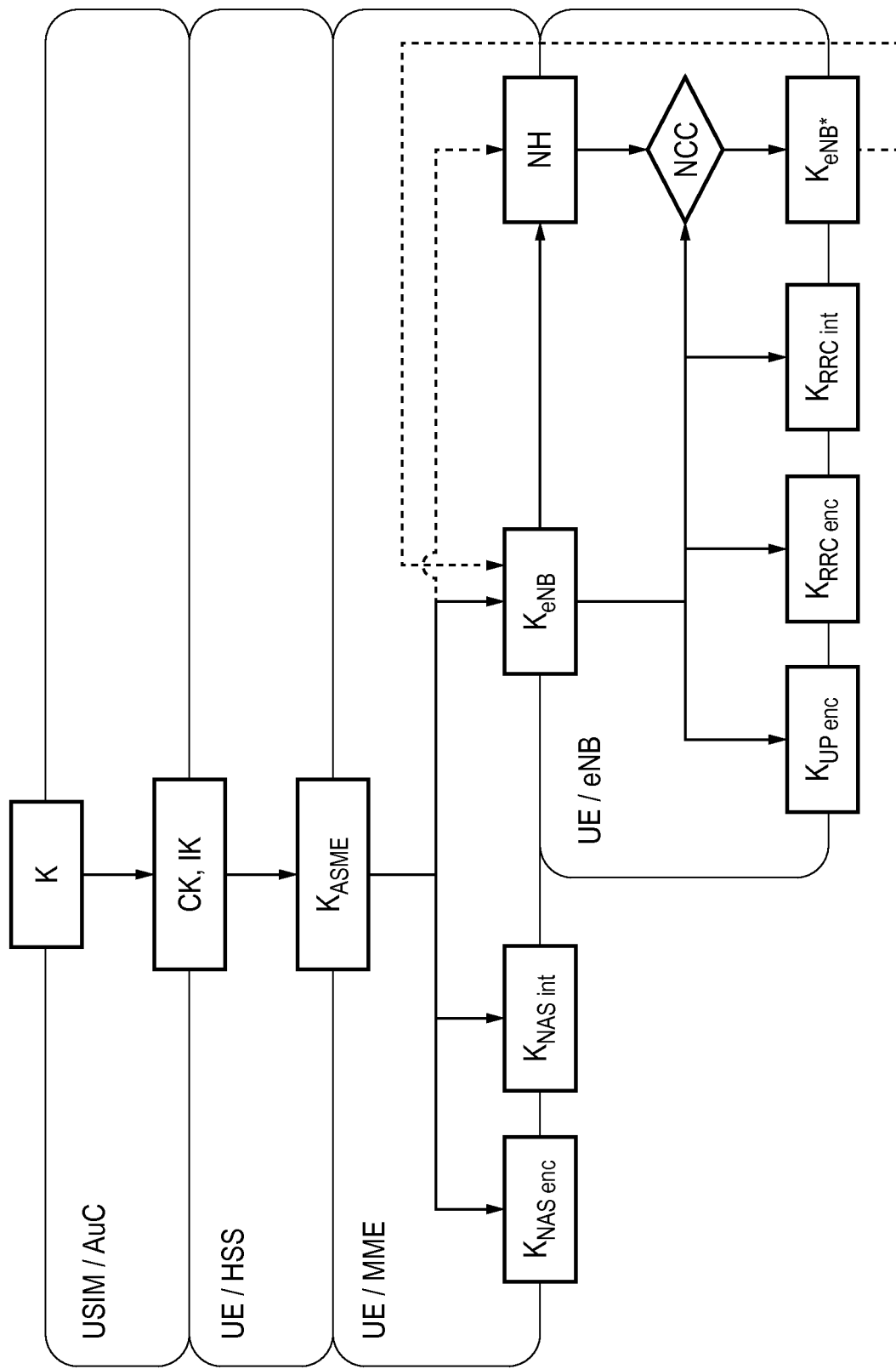
FIGS. 8 to 10 schematically represents some aspects of security key generation in wireless telecommunications systems.

Security key handling is an important aspect of wireless telecommunications systems. An example overview of security key generation, in this example in the context of an LTE system, is schematically shown in FIG. 8. Further details of the established practices for security key generation, such as represented in FIG. 8, are well understood and use can also be found in the relevant standards, for example ETSI TS 136 300 V13.2.0 (2016-01)/3GPP TS 36.300 version 13.2.0 Release 13 [7] (in particular Section 14).

FIG. 8 corresponds to FIG. 14.1-1 in ETSI TS 136 300 V13.2.0 (2016-01)/3GPP TS 36.300 version 13.2.0 Release 13 [7] and schematically represents keys derived at different entities when an AKA (Authentication and Key Agreement) procedure is run. Signalling for the AKA procedure is not represented here for simplicity, but details of this can found, for example, in ETSI TS 33 401 V14.2.0 (2016-01)/3GPP TS 33.401 version 14.2.0 Release 14 [8] (e.g. see Section 7). The bottom set of keys represented in FIG. 8 are used for user plane encryption (KUP enc), RRC encryption (RRC enc) and RRC integrity protection (KRRC int) (user plane data is not integrity protected).

Figure 9:
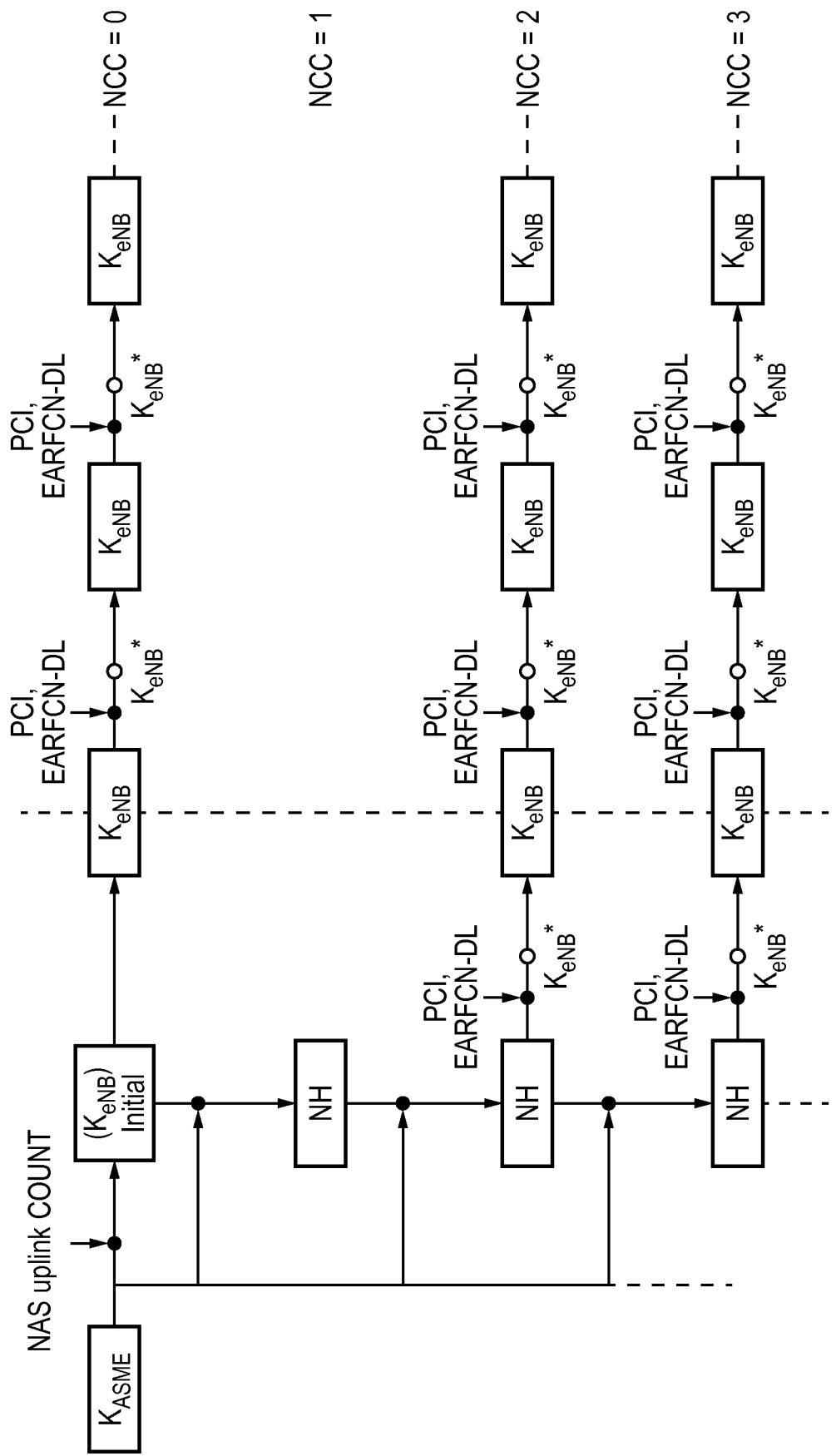

Also represented in the bottom set of keys in FIG. 8 is KeNB*. This is a key associated with handover. It is derived by a terminal device and source network access node from either KeNB or from a fresh new hop (NH). KeNB* is used by the terminal device and target network access node as a new KeNB for RRC (radio resource control) and UP (user plane) traffic. The derivation of keys during handover is schematically shown in FIG. 9. Further details of this can also be found in Section 7 in ETSI TS 33 401 V14.2.0 (2016-01)/3GPP TS 33.401 version 14.2.0 Release 14 [8].

FIG. 9 corresponds to FIG. 7.2.8.1-1 in ETSI TS 33 401 V14.2.0 (2016-01)/3GPP TS 33.401 version 14.2.0 Release 14 [8] and schematically represents key handling during handover. As can be seen in FIG. 9, for this example process the generation of KeNB* has EARFCN-DL (E-UTRA Absolute Radio Frequency Channel Number—downlink) and PCI (Physical Cell Identity) as inputs (and existing KeNB). However, it may be expected that methods of deriving security keys in new generation networks (NR networks) may not use cell ID (e.g. PCI) for this kind of key derivation.

Figure 10:
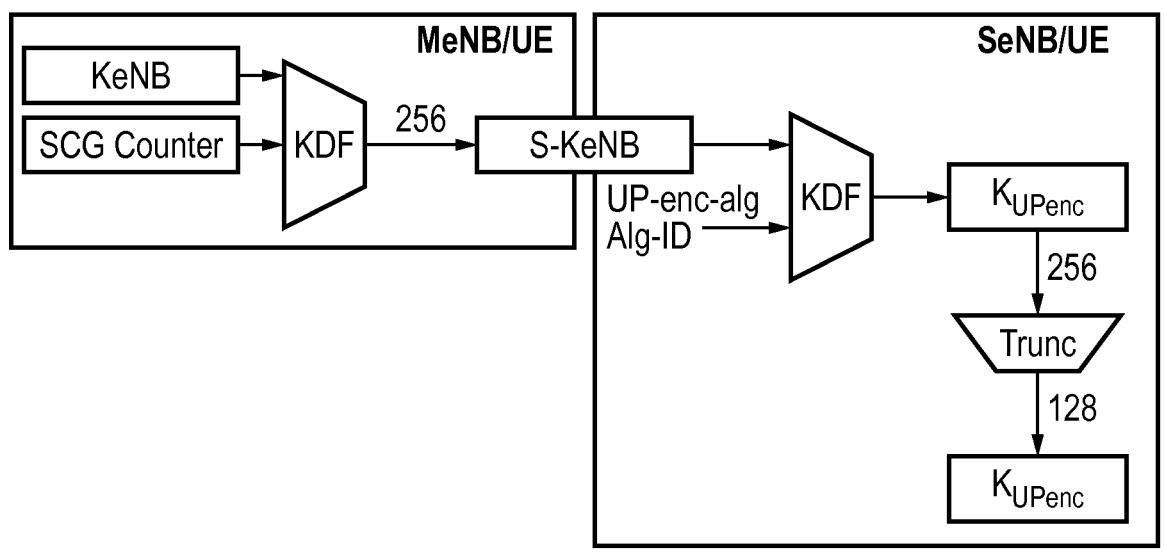

As noted above, in a dual connectivity context the master network access node may use a key designated KeNB and the secondary network access node may use a key designated SKeNB. FIG. 10 schematically represents an approach for SKeNB generation. As can be seen the SKeNB is generated by the master network access node and terminal device using a key derivation function having the KeNB and a secondary cell group counter as inputs (it does not use a cell ID/PCI as an input). The SKeNB is passed from the master network access node to the secondary network access node when adding a secondary cell group. The SKeNB is then used by the secondary network access node and terminal device to generate KUPenc (key for user plane encryption) for the secondary network access node. FIG. 10 corresponds to FIG. 14.1-2 in ETSI TS 136 300 V13.2.0 (2016-01)/3GPP TS 36.300 version 13.2.0 Release 13 [7] and further details of the process can be found therein.

Approaches in accordance with certain embodiments of the disclosure consider issues surrounding the handling of keys in a dual connectivity scenario in which a secondary network access node is switched to become a master network access node, for example as a result of terminal device mobility such as discussed above with reference to FIG. 7.

Figure 11:
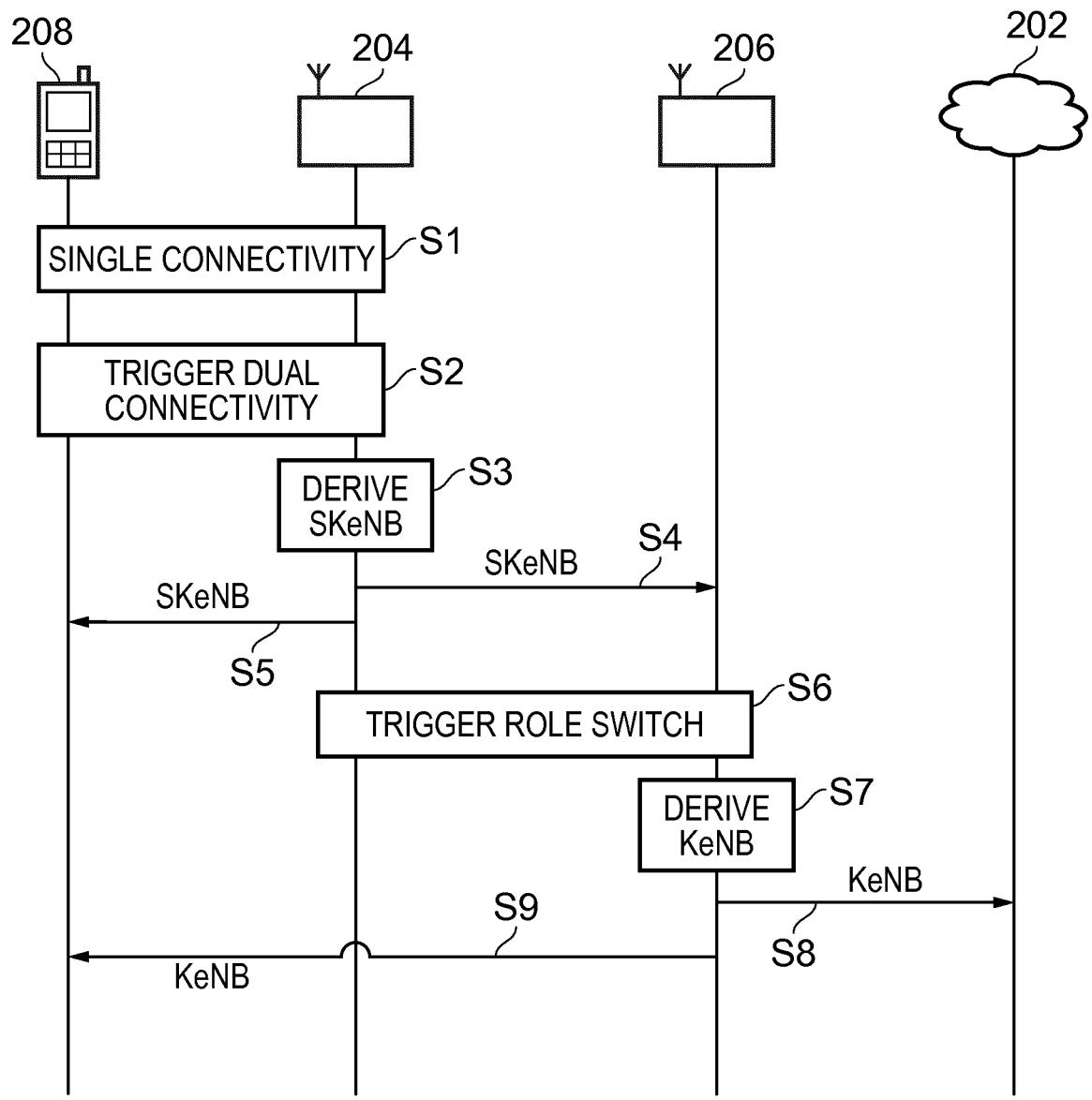
FIG. 11 is a signalling ladder diagrams schematically representing some operating aspects of wireless telecommunications networks/systems in accordance with certain embodiments of the disclosure.

FIG. 11 is a signalling ladder diagram schematically representing some operating aspects of the wireless telecommunications system 200 shown in FIG. 5 in accordance with certain embodiments of the disclosure. In particular, the diagram represents some operations and signalling exchange associated with the terminal device 208, the source network access node 204, the target network access node 206 and the core network 202 in accordance with certain embodiments of the disclosure.

For this example implementation, it is assumed the terminal device is initially operating on the source network access node (which may also be referred to as a first network access node). The terminal device then moves towards a boundary region between the source network access node and the target network access node (which may also be referred to as a second network access node). In response the terminal device is configured for dual connectivity with the source network access node acting as a master network access node (MeNB) and the target network access node acting as a secondary network access node (SeNB). Subsequently, the terminal device moves away from the coverage of the source network access node (configured as the master network access node for the dual connectivity), and consequently the second network access node (configured as the secondary network access node for the dual connectivity) is reconfigured as a master network access node for dual connectivity.

Thus, processing starts in S1 with the terminal device 208 being connected to the source (first) network access node 204.

In step S2 of the processing it is determined the terminal device should enter a dual connectivity mode of operation because it is approaching a boundary region between the source and target network access nodes (i.e. there is a potential for handover from the source network access node to the target network access node). The manner in which it is determined the terminal device is entering a boundary region and a handover procedures should be initiated (which may or may not result in a handover depending on the terminal devices subsequent mobility) may be based on conventional techniques. For example taking account of measurements of radio channel conditions between the terminal device and respective ones of the network access nodes, such as a received power or quality of reference symbols transmitted by the respective network access nodes. It will be appreciated that different ways of measuring radio channel conditions may be provided in different implementations. For example, in a new radio access technology (NR) network, radio channel conditions measurements may be based on uplink reference signalling, rather than downlink reference signalling. However, it will be appreciated the specific manner in which the measurements of radio channel conditions are established, and more generally the manner in which it is determined dual connectivity should be triggered, is not of primary significance to the principles described herein.

Thus, the source network access node is configured as a master network access node for the dual connectivity and is associated with a master network access node security key (e.g. a KeNB) and the target network access node is configured as a secondary network access node for the dual connectivity and is associated with a secondary network access node security key (e.g. a SKeNB). The derivation and sharing of the master network access node security key and the secondary network access node security key may be based on conventional techniques. For example, and as schematically represented in step S3, step S4 and step S5 in FIG. 11, the source network access node may derive the secondary network access node security key from the master network access node security key in accordance with established practices, for example using a key derivation function of the kind represented in FIG. 10, and may convey an indication of the secondary network access node security key to the target network access node and the terminal device. It will be appreciated that in some implementations the secondary network access node security key itself may not be sent from the source network access node 204 to the target network access node 206 and/or the terminal device 208, but rather an indication that allows the target network access node and the terminal device to independently derive the secondary network access mode security key may be sent instead. If the secondary network access node security key itself is sent, it will typically be encrypted. Nonetheless, for terminological convenience, the process of conveying information to allow a security key to be derived may be referred to herein as simply sending the security key.

In step S6 represented in FIG. 11, it is determined the current dual connectivity role of the target network access node (i.e. the network access node currently acting as a secondary network access node for the dual connectivity with the terminal device) should be switched, and in particular the source network access node for the handover should be configured as a new master network access for supporting dual connectivity with the terminal device. This may be based on determining the mobile terminal device is moving away from the coverage of the first network access node (currently acting as master network access node) and towards the coverage of a further network access node, example as discussed above with reference to FIG. 7. This determination may again be based on measurements of radio channel conditions associated with the various network access nodes. The decision may be made by either one of the source and target network access nodes according to the implementation at hand. It will be appreciated the specific manner in which it is determined when the secondary network access node should be reconfigured as a master network access node is not of primary significance to the principles described herein.

In step S7, the target network access node (i.e. the network access node which is to switch from acting as a secondary network access node to a master network access node) derives a new master network access node security (KeNB) to be used by the target network access node when it becomes master network access node. There are various different ways in which the new master network access node security key may be derived by the target network access node, as discussed further below.

In steps S8 and S9 the target network access node conveys an indication of the new master network access node security key to the terminal device and the core network, thereby allowing the target network access node to switch from operating as a secondary network access node to a master network access node for the terminal device. It will be appreciated that as with SKeNB, the new master network access node security key itself may not be sent from the source network access node 204 to the target network access node 206 and/or the terminal device 208, but rather an indication that allows the target network access node and the terminal device to independently derive the new master network access mode security key may be sent instead. To the extent any security keys are sent between elements of the wireless telecommunications system, they may be encrypted. Nonetheless, and as already mentioned above, for terminological convenience and ease of representation in the figures, the process of conveying information to allow a security key to be derived may be referred to herein and schematically shown in the figures as simply sending the security key.

Thus the processing discussed above in relation to FIG. 11 represents an approach for handling security keys to support the use of dual connectivity for handover in wireless telecommunication systems in accordance with certain embodiments of the disclosure.

To summarise some approaches in accordance with certain embodiments of the disclosure, FIG. 11 schematically represents a method of operation in a wireless telecommunication system comprising a terminal device, a first network access node and a second network access node.

The example method includes configuring the second network access node to act as a secondary network access node for a dual connectivity mode of operation for the terminal device in which the first network access node acts as a master network access node, wherein the first network access node is associated with a master network access node security key and the second network access node is associated with a secondary network access node security key, wherein the secondary network access node security key is derived from the master network access node security key and is established by the second network access node from information received from the first network access node.

The example method further includes establishing, while the second network access node is acting as secondary network access node for the dual connectivity mode of operation for the terminal device, that the second network access node should switch to acting as a master network access node for the dual connectivity mode of operation for the terminal device.

The example method further includes the second network access node deriving a new master network access node security key to be used by the second network access node when it is switched to acting as a master network access node for the dual connectivity mode of operation for the terminal device.

The example method further includes configuring the second network access node to act a master network access node for the dual connectivity mode of operation for the terminal device using the new master network access node security key, example this may involve riding the core network and the terminal device with an indication of the new master network access node key and that the changing role has occurred.

As noted above, there are various different ways in which the new master network access node key may be derived by the second network access node in step S7.

For example, in some implementations is the new master network access node security key may be derived by the second network access node from the secondary network access node security key. For example, the new master network access node security key a be derived from the secondary network access nodes existing secondary network access node security key using a key derivation process defined for use in the wireless telecommunications system for generating a target network access node security key from a source network access node security key in a handover procedure, example using an approach such as that represented in FIG. 9. In other examples the new master network access node security key may be derived by combining the existing secondary network access node security key with a predetermined number, example in logical AND, OR or XOR type of operation. The predetermined number may be fixed, or correspond with a counter associated with the terminal device. For example, the counter could be a 4 bit or 16 bit (or other size) counter incremented, for example, when PCI/EARFCN is not used as an input parameter to a KeNB* key derivation process and horizontal derivation has been used, e.g. corresponding to the case of NCC value=0 and KeNB initial value as shown in FIG. 9. If PCI/EARFCN value is used in the derivation of KeNB (secondary becoming master key) then this new counter is not incremented. So this approach can be considered to in effect replace Cell ID with a counter in the key derivation process. In yet another example, the new master network access node security may simply be taken to be the same as the existing secondary network access node security key (i.e. the existing secondary network access node security may be used as a master network access node security key).

In accordance with some other implementations, the new master network access node security key might not be derived from the existing secondary network access node security key, but may instead be reconfigured by triggering an authentication and key agreement, AKA, procedure to refresh security keys associated with the terminal device in the wireless telecommunications system. This procedure may be based on conventional techniques, or maybe a shortened/reduced procedure in which not all keys are refreshed. For example, the wireless network may support a hierarchical arrangement of security keys of the kind represented in FIG. 8, whereby a security key at one level in the hierarchy is used to derive a security key at the next level down in the hierarchy. In order to derive a new master network access node security key, a reduced authentication and key agreement procedure may be run to refresh a key in the hierarchical level above the network access node security keys (e.g. to refresh the key KASME in the example of FIG. 8), but without refreshing higher layer keys. This kind of reduced/shortened AKA procedure may be run more quickly than a full AKA procedure.

In some other examples the new master network access node key may be derived by the second network access node based on information received from the first network access node. In this regard, the new master network access node key may be provided to the secondary network access nodes by the master network access node in a corresponding manner to that in which a KeNB* key is provided to a target network access node by a source network access node in a conventional handover procedure.

One significant aspects of the processing represented in FIG. 11 is that the second network access node may be associated with a secondary network access node security key as part of being configured as a secondary network access node even in cases where the secondary network access node is not configured for use with a secondary cell group dual connectivity mode of operation. Normally in such cases the secondary network access node in a dual connectivity scenario would not have its own security context, and so would not be associated with a security key. Nonetheless, in accordance with certain embodiments of the disclosure, a network access node may be associated with network access node security key win configured as a secondary network access node for dual connectivity, even if it does not need the key to support that dual connectivity. This is so that the secondary network access node has the key nonetheless so that it may be used later used to generate a new master network access node security key if the secondary network access node needs to switch roles in this regard.

It will be appreciated the processing described above with reference to FIG. 11 represents only one particular example approach, and variations may be adopted in different implications. For example, the steps represented in FIG. 11 may, in some implementations, the performed in a different order, and some steps may be combined. For example, in some implementations steps S4 and S5 may be performed later in the process, for example only after step S6 when it is determined a change in role should occur (the secondary network access node does not need the SKeNB to support all forms of dual connectivity). Furthermore, in some cases steps S5 and S9 can be combined (i.e. the terminal device can be provided with an indication of SKeNB and KeNB at the same time), and likewise steps S4 and S8 may be combined in some cases. However, the two-stage approach represented in FIG. 11 may be considered preferable in some circumstances because it can help reduce interruptions in data transfer. When steps S5 and S9 are combined in a single step, this combined step may be performed at a point corresponding to step S5 or S9 in the processing represented in FIG. 11. When performed around the time of S5, step S7 will also need to be performed before S5. Thus a KeNB may be established by the secondary network access node and shared with the terminal device and core network before it is determined the role change should occur. This can help make the role change faster when it is triggered as some of the security key handling has already been performed. When the terminal device has a KeNB associated with the master network access node, and also a new KeNB associated with the secondary network access node, it may include an indication in association with its uplink transmissions, e.g. a setting in a field in a packet header, to indicate which security has been used. Similarly comment apply for the core network, e.g. when steps S4 and S8 are combined in a single step, the combined step may be performed at a point corresponding to step S4 or S8 in the processing represented in FIG. 11.

Thus there has been described method of operating a second network access node in a wireless telecommunication system comprising a terminal device, a first network access node and the second network access node, wherein the method comprises: configuring the second network access node to act as a secondary network access node for a dual connectivity mode of operation for the terminal device in which the first network access node acts as a master network access node, wherein the first network access node is associated with a master network access node security key and the second network access node is associated with a secondary network access node security key, wherein the secondary network access node security key is derived from the master network access node security key and is established by the second network access node from information received from the first network access node; establishing, while the second network access node is acting as secondary network access node for the dual connectivity mode of operation for the terminal device, that the second network access node should switch to acting as a master network access node for the dual connectivity mode of operation for the terminal device; deriving a new master network access node security key to be used by the second network access node when it is switched to acting as a master network access node for the dual connectivity mode of operation for the terminal device; and configuring the second network access node to act a master network access node for the dual connectivity mode of operation for the terminal device using the new master network access node security key.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the terminal device. It will be appreciated such predetermined/predefined information may in general be established, for example, by definition in an operating standard for the wireless telecommunication system, or in previously exchanged signalling between the base station and terminal devices, for example in system information signalling, or in association with radio resource control setup signalling. That is to say, the specific manner in which the relevant predefined information is established and shared between the various elements of the wireless telecommunications system is not significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not significance to the principles of operation described herein.

Respective features of the present disclosure are defined by the following numbered paragraphs:

1. A method of operating a second network access node in a wireless telecommunication system comprising a terminal device, a first network access node and the second network access node, wherein the method comprises: configuring the second network access node to act as a secondary network access node for a dual connectivity mode of operation for the terminal device in which the first network access node acts as a master network access node, wherein the first network access node is associated with a master network access node security key and the second network access node is associated with a secondary network access node security key, wherein the secondary network access node security key is derived from the master network access node security key and is established by the second network access node from information received from the first network access node; establishing, while the second network access node is acting as secondary network access node for the dual connectivity mode of operation for the terminal device, that the second network access node should switch to acting as a master network access node for the dual connectivity mode of operation for the terminal device; deriving a new master network access node security key to be used by the second network access node when it is switched to acting as a master network access node for the dual connectivity mode of operation for the terminal device; and configuring the second network access node to act a master network access node for the dual connectivity mode of operation for the terminal device using the new master network access node security key.

Paragraph 2. The method of paragraph 1, wherein the new master network access node security key is derived by the second network access node from the secondary network access node security key.

Paragraph 3. The method of paragraph 2, wherein the new master network access node security key is derived from the secondary network access node security key using a key derivation process used in the wireless telecommunications system for generating a target network access node security key from a source network access node security key in a handover procedure.

Paragraph 4. The method of paragraph 2, wherein the new master network access node security key is derived from the secondary network access node security key by combining the secondary network access node security key with a predetermined number.

Paragraph 5. The method of paragraph 4, wherein predetermined number is a fixed number or a number derived from a counter.

Paragraph 6. The method of paragraph 2, wherein the new master network access node security key is the same as the secondary network access node security key.

Paragraph 7. The method of any of paragraphs 1 to 6, further comprising the second network access node conveying to the terminal device an indication of the new master network access node security key.

Paragraph 8. The method of any of paragraphs 1 to 7, further comprising the second network access node conveying to a core network part of the wireless telecommunications system an indication of the new master network access node security key.

Paragraph 9. The method of any of paragraphs 1 to 8, wherein the new master network access node security key is derived by running an authentication and key agreement, AKA, procedure to refresh security keys associated with the terminal device in the wireless telecommunications system.

Paragraph 10. The method of paragraph 9, wherein the wireless network supports a hierarchical arrangement of security keys, whereby a security key at one level in the hierarchy is used to derive a security key at the next level down in the hierarchy, and wherein the new master network access node security key is at a first level in the hierarchy and the authentication and key agreement, AKA, procedure is a reduced authentication and key agreement, AKA, procedure for refreshing keys in a level in the hierarchy that is one level above the first level, but not at a higher levels in the hierarchy.

Paragraph 11. The method of any of paragraphs 1 to 10, wherein the new master network access node security key is derived by the second network access node using information received from the first network access node.

Paragraph 12. The method of any of paragraphs 1 to 11, wherein the second network access node is not configured for use with a secondary cell group bearer when it is configured to act as a secondary network access node.

Paragraph 13. The method of any of paragraphs 1 to 12, wherein the step of establishing that the second network access node should switch to acting as a master network access node for the dual connectivity mode of operation for the terminal device is based on a measurement of radio channel conditions between the terminal device and the first and/or second network access node.

Paragraph 14. The method of any of paragraphs 1 to 13, further comprising receiving, from the terminal device, a block of data, and establishing from an indication received from the terminal device in association with the block of data an identifier for a security key used by the terminal device for its transmission of the block of data.

Paragraph 15. A second network access node for use in a wireless telecommunication system comprising a terminal device, a first network access node and the second network access node, wherein the second network access node comprises controller circuitry and transceiver circuitry configured to operate together such that the second network access node is operable to: configure the second network access node to act as a secondary network access node for a dual connectivity mode of operation for the terminal device in which the first network access node acts as a master network access node, wherein the first network access node is associated with a master network access node security key and the second network access node is associated with a secondary network access node security key, wherein the secondary network access node security key is derived from the master network access node security key and is established by the second network access node from information received from the first network access node; establish, while the second network access node is acting as secondary network access node for the dual connectivity mode of operation for the terminal device, that the second network access node should switch to acting as a master network access node for the dual connectivity mode of operation for the terminal device; derive a new master network access node security key to be used by the second network access node when it is switched to acting as a master network access node for the dual connectivity mode of operation for the terminal device; and configure the second network access node to act a master network access node for the dual connectivity mode of operation for the terminal device using the new master network access node security key.

Paragraph 16. Circuitry for a second network access node for use in a wireless telecommunication system comprising a terminal device, a first network access node and the second network access node, wherein the circuitry comprises controller circuitry and transceiver circuitry configured to operate together such that the circuitry is operable to: configure the second network access node to act as a secondary network access node for a dual connectivity mode of operation for the terminal device in which the first network access node acts as a master network access node, wherein the first network access node is associated with a master network access node security key and the second network access node is associated with a secondary network access node security key, wherein the secondary network access node security key is derived from the master network access node security key and is established by the second network access node from information received from the first network access node; establish, while the second network access node is acting as secondary network access node for the dual connectivity mode of operation for the terminal device, that the second network access node should switch to acting as a master network access node for the dual connectivity mode of operation for the terminal device; derive a new master network access node security key to be used by the second network access node when it is switched to acting as a master network access node for the dual connectivity mode of operation for the terminal device; and configure the second network access node to act a master network access node for the dual connectivity mode of operation for the terminal device using the new master network access node security key.

Paragraph 17. A method of operating a terminal device in a wireless telecommunication system comprising the terminal device, a first network access node and a second network access node, wherein the method comprises: configuring the terminal device to operate in a dual connectivity mode of operation with the first network access node acting as a master network access node for the dual connectivity mode of operation and the second network access node acting as a secondary network access node, wherein the first network access node is associated with a master network access node security key and the second network access node is associated with a secondary network access node security key, wherein the secondary network access node security key is derived from the master network access node security key; establishing, while the second network access node is acting as secondary network access node for the dual connectivity mode of operation for the terminal device, that the second network access node is to switch to acting as a master network access node for the dual connectivity mode of operation for the terminal device; establishing a new master network access node security key to be used by the second network access node when it is switched to acting as a master network access node for the dual connectivity mode of operation for the terminal device; and configuring the terminal device to communicate with the second network access node using the new master network access node security key.

Paragraph 18. A terminal device for use in a wireless telecommunication system comprising the terminal device, a first network access node and a second network access node, wherein the terminal device comprises controller circuitry and transceiver circuitry configured to operate together such that the terminal device is operable to: configure the terminal device to operate in a dual connectivity mode of operation with the first network access node acting as a master network access node for the dual connectivity mode of operation and the second network access node acting as a secondary network access node, wherein the first network access node is associated with a master network access node security key and the second network access node is associated with a secondary network access node security key, wherein the secondary network access node security key is derived from the master network access node security key; establish, while the second network access node is acting as secondary network access node for the dual connectivity mode of operation for the terminal device, that the second network access node is to switch to acting as a master network access node for the dual connectivity mode of operation for the terminal device; establish a new master network access node security key to be used by the second network access node when it is switched to acting as a master network access node for the dual connectivity mode of operation for the terminal device; and configure the terminal device to communicate with the second network access node using the new master network access node security key.

Paragraph 19. Circuitry for a terminal device for use in a wireless telecommunication system comprising the terminal device, a first network access node and a second network access node, wherein the circuitry comprises controller circuitry and transceiver circuitry configured to operate together such that the circuitry is operable to: configure the terminal device to operate in a dual connectivity mode of operation with the first network access node acting as a master network access node for the dual connectivity mode of operation and the second network access node acting as a secondary network access node, wherein the first network access node is associated with a master network access node security key and the second network access node is associated with a secondary network access node security key, wherein the secondary network access node security key is derived from the master network access node security key; establish, while the second network access node is acting as secondary network access node for the dual connectivity mode of operation for the terminal device, that the second network access node is to switch to acting as a master network access node for the dual connectivity mode of operation for the terminal device; establish a new master network access node security key to be used by the second network access node when it is switched to acting as a master network access node for the dual connectivity mode of operation for the terminal device; and configure the terminal device to communicate with the second network access node using the new master network access node security key.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] 3GPP document RP-160671, "New SID Proposal: Study on New Radio Access Technology," NTT DOCOMO, RAN #71, Gothenburg, Sweden, 7 to 10. Mar., 2016.

[2] Holma H. and Toskala A, "LTE for UMTS OFDMA and SC-FDMA based radio access", John Wiley and Sons, 2009.

[3] "Conditional Handover", 3GPP TSG RAN WG2 Meeting #97, R2-1700864, Athens, Greece 13—17 Feb. 2017.

[4] "NW controlled autonomous handover in single connectivity", 3GPP TSG RAN WG2 Meeting #97, R2-1701711, Athens, Greece 13—17 Feb. 2017.

[5] "Introduction of UE autonomous mobility", 3GPP TSG RAN WG2 Meeting #97, R2-1701360, Athens, Greece 13—17 Feb. 2017.

[6] "SgNB to MgNB reconfiguration for Oms interruption handover", 3GPP TSG-RAN WG2 #97bis, R2-1703381, submitted for meeting at Spokane, USA, 3-7 Apr. 2017

[7] ETSI TS 136 300 V13.2.0 (2016-01)/3GPP TS 36.300 version 13.2.0 Release 13

[8] ETSI TS 33 401 V14.2.0 (2016-01)/3GPP TS 33.401 version 14.2.0 Release 14

What is claimed is:

1. A method of operating a second network access node in a wireless telecommunication system comprising a terminal device, a first network access node and the second network access node, wherein the method comprises:
configuring the second network access node to act as a secondary network access node for a dual connectivity mode of operation for the terminal device in which the first network access node acts as a master network access node, wherein the first network access node is associated with a master network access node security key and the second network access node is associated with a secondary network access node security key, wherein the secondary network access node security key is derived from the master network access node security key and is established by the second network access node from information received from the first network access node;
establishing, while the second network access node is acting as secondary network access node for the dual connectivity mode of operation for the terminal device, that the second network access node should switch to acting as a master network access node;
deriving a new master network access node security key to be used by the second network access node when it is switched to acting as a master network access node for the terminal device; and
configuring the second network access node to act a master network access node for the terminal device using the new master network access node security key, wherein the new master network access node security key is derived by the second network access node by combining the information received from the first network access node with a predetermined number.

2. The method of claim 1, wherein the new master network access node security key is derived from the secondary network access node security key using a key derivation process used in the wireless telecommunications system for generating a target network access node security key from a source network access node security key in a handover procedure.

3. The method of claim 1, wherein predetermined number is a fixed number or a number derived from a counter.

4. The method of claim 1, wherein the new master network access node security key is the same as the secondary network access node security key.

5. The method of claim 1, further comprising the second network access node conveying to the terminal device an indication of the new master network access node security key.

6. The method of claim 1, further comprising the second network access node conveying to a core network part of the wireless telecommunications system an indication of the new master network access node security key.

7. The method of claim 1, wherein the new master network access node security key is derived by running an authentication and key agreement, AKA, procedure to refresh security keys associated with the terminal device in the wireless telecommunications system.

8. The method of claim 7, wherein the wireless network supports a hierarchical arrangement of security keys, whereby a security key at one level in the hierarchy is used to derive a security key at the next level down in the hierarchy, and wherein the new master network access node security key is at a first level in the hierarchy and the authentication and key agreement, AKA, procedure is a reduced authentication and key agreement, AKA, procedure for refreshing keys in a level in the hierarchy that is one level above the first level, but not at a higher levels in the hierarchy.

9. The method of claim 1, wherein the new master network access node security key is derived by the second network access node using information received from the first network access node.

10. The method of claim 1, wherein the second network access node is not configured for use with a secondary cell group bearer when it is configured to act as a secondary network access node.

11. The method of claim 1, further comprising receiving, from the terminal device, a block of data, and establishing from an indication received from the terminal device in association with the block of data an identifier for a security key used by the terminal device for its transmission of the block of data.

12. A method of operating a second network access node in a wireless telecommunication system comprising a terminal device, a first network access node and the second network access node, wherein the method comprises:
configuring the second network access node to act as a secondary network access node for a dual connectivity mode of operation for the terminal device in which the first network access node acts as a master network access node, wherein the first network access node is associated with a master network access node security key and the second network access node is associated with a secondary network access node security key, wherein the secondary network access node security key is derived from the master network access node security key and is established by the second network access node from information received from the first network access node;
establishing, while the second network access node is acting as secondary network access node for the dual connectivity mode of operation for the terminal device, that the second network access node should switch to acting as a master network access node;
deriving a new master network access node security key to be used by the second network access node when it is switched to acting as a master network access node for the terminal device; and
configuring the second network access node to act a master network access node for the terminal device using the new master network access node security key, wherein the step of establishing that the second network access node should switch to acting as a master network access node for the dual connectivity mode of operation for the terminal device is based on a measurement of radio channel conditions between the terminal device and the first and/or second network access node.

13. Circuitry for a second network access node for use in a wireless telecommunication system comprising a terminal device, a first network access node and the second network access node, wherein the circuitry comprises controller circuitry and transceiver circuitry configured to operate together such that the circuitry is operable to:
configure the second network access node to act as a secondary network access node for a dual connectivity mode of operation for the terminal device in which the first network access node acts as a master network access node, wherein the first network access node is associated with a master network access node security key and the second network access node is associated with a secondary network access node security key, wherein the secondary network access node security key is derived from the master network access node security key and is established by the second network access node from information received from the first network access node;
establish, while the second network access node is acting as secondary network access node for the dual connectivity mode of operation for the terminal device, that the second network access node should switch to acting as a master network access node for the terminal device;
derive a new master network access node security key to be used by the second network access node when it is switched to acting as a master network access node for the terminal device; and
configure the second network access node to act a master network access node for the terminal device using the new master network access node security key, wherein the new master network access node security key is derived by the second network access node by combining the information received from the first network access node with a predetermined number.

14. A terminal device for use in a wireless telecommunication system comprising the terminal device, a first network access node and a second network access node, wherein the terminal device comprises controller circuitry and transceiver circuitry configured to operate together such that the terminal device is operable to:
configure the terminal device to operate in a dual connectivity mode of operation with the first network access node acting as a master network access node for the dual connectivity mode of operation and the second network access node acting as a secondary network access node, wherein the first network access node is associated with a master network access node security key and the second network access node is associated with a secondary network access node security key, wherein the secondary network access node security key is derived from the master network access node security key;
establish, while the second network access node is acting as secondary network access node for the dual connectivity mode of operation for the terminal device, that the second network access node is to switch to acting as a master network access node for the dual connectivity mode of operation for the terminal device;
establish a new master network access node security key to be used by the second network access node when it is switched to acting as a master network access node for the dual connectivity mode of operation for the terminal device; and
configure the terminal device to communicate with the second network access node using the new master network access node security key, wherein the new master network access node security key is derived by the second network access node by combining the information received from the first network access node with a predetermined number.

\* \* \* \* \*